(12) United States Patent
Raleigh et al.

(10) Patent No.: US 6,805,370 B2
(45) Date of Patent: Oct. 19, 2004

(54) INDEPENDENTLY-SUSPENDED REAR CORNER MODULE FOR MOTOR VEHICLE CHASSIS FEATURING SHACKLED LEAF SPRING

(75) Inventors: Timothy P. Raleigh, Macomb Township, MI (US); Jian M. Wang, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 69 days.

(21) Appl. No.: 10/290,699

(22) Filed: Nov. 8, 2002

(65) Prior Publication Data

US 2004/0090032 A1 May 13, 2004

(51) Int. Cl.⁷ ................................................ B60G 11/10
(52) U.S. Cl. ...................... 280/124.175; 280/124.148; 280/124.17; 267/227
(58) Field of Search ...................... 280/124.17, 124.175, 280/124.176, 124.14, 124.128, 124.153, 124.148; 267/227, 234, 243, 51, 52, 53

(56) References Cited

U.S. PATENT DOCUMENTS

| 129,717 | A | | 7/1872 | Cornwell |
| 1,211,816 | A | | 1/1917 | Blackley |
| 2,200,177 | A | | 5/1940 | Klavik |
| 2,761,696 | A | * | 9/1956 | Brown ................. 280/124.138 |
| 3,904,219 | A | * | 9/1975 | Guerriero ............. 280/124.177 |
| 3,912,296 | A | | 10/1975 | Allison et al. |
| 4,087,115 | A | | 5/1978 | Earle |
| 4,143,888 | A | | 3/1979 | Heinig |
| 4,630,804 | A | * | 12/1986 | Fesko .......................... 267/52 |
| 4,681,343 | A | | 7/1987 | Gallet et al. |
| 4,684,110 | A | * | 8/1987 | Sale et al. ..................... 267/52 |
| 4,690,426 | A | | 9/1987 | Kubo et al. |
| 4,758,019 | A | | 7/1988 | Tucker-Peake et al. |
| 5,129,672 | A | | 7/1992 | Hiromoto et al. |
| 5,251,886 | A | | 10/1993 | Bursel |
| 5,478,104 | A | | 12/1995 | Worrel et al. |

* cited by examiner

Primary Examiner—David R. Dunn
(74) Attorney, Agent, or Firm—Brinks Hofer Gilson & Lione

(57) ABSTRACT

An independent rear suspension for a motor vehicle chassis includes a pair of independent rear corner modules. Each rear corner module includes a generally-longitudinally-extending leaf spring whose forward end is adapted to be pivotally mounted to the vehicle chassis at a first forward attachment point, and whose rearward end is nonrotationally-coupled to a knuckle, such that the leaf spring operates as a trailing arm to longitudinally position the knuckle relative to the chassis. A shackle adapted to be pivotally mounted on the chassis at a second forward attachment point includes an eye that encompasses a portion of the spring intermediate the first and second end of the spring. The shackle permits a predetermined, nonzero range of relative longitudinal, transverse, and torsional movement of the intermediate portion of the leaf spring while otherwise transferring vertical loads from the intermediate portion of the spring to the chassis.

7 Claims, 4 Drawing Sheets

INDEPENDENTLY-SUSPENDED REAR CORNER MODULE FOR MOTOR VEHICLE CHASSIS FEATURING SHACKLED LEAF SPRING

FIELD OF INVENTION

The invention relates to an independent rear suspension for a motor vehicle.

BACKGROUND OF THE INVENTION

The prior art teaches that certain benefits are achieved through use of so-called "independent" vehicle suspensions, in which the position of a given wheel relative to a vehicle's chassis remains generally unaffected by the relative movement of another wheel on the vehicle. Generally, such independent suspensions employ "corner modules" that include a knuckle that is coupled by lateral and trailing links or "control arms" to each of several attachment points defined on the chassis. Typically, a bushing or ball joint is utilized at the respective ends of each control arm to thereby pivotally couple the control arm to both the knuckle and the chassis. A coil spring and damper are typically disposed above the knuckle, between the knuckle and the chassis, to complete the corner module. The control arms together define the range of relative movement through which the knuckle and, hence, the associated wheelend assembly can travel as the knuckle is displaced vertically toward the chassis, including relative changes in longitudinal wheel location, wheel camber, and wheel toe-in, while the coil spring and damper cooperate to define certain parameters of such movement.

In certain vehicle designs that provide limited space above the wheelend assembly within which to locate the coil spring, the prior art has sought to utilize cantilevered leaf springs in place of the coil spring. Such cantilevered leaf springs generally extend from a location on the vehicle chassis either forward of, or transverse relative to, the nominal wheel location, and may even perform a dual function by replacing one of the corner module's control arms, thereby advantageously reducing the associated parts count of the corner module.

Thus, for example, in U.S. Pat. No. 4,143,888, a leaf spring is nonrotatably coupled at either end to the chassis and the knuckle, respectively, to thereby provide a particularly compact structure in which the leaf spring acts as a trailing arm to constrain longitudinal movement of the wheelend assembly. However, the rigid attachment of the leaf spring to the vehicle frame, as taught in the '888 patent, concentrates all reacting loads on the single chassis attachment point, thereby generating a large stress on the chassis. Further, because the rigid attachment of the spring to the frame provides no lateral, longitudinal, or torsional compliance, the leaf spring tends to constrain knuckle movement that might otherwise be achieved with the defined control arm configuration and, specifically, limit the range of available wheel camber and toe-in change achieved by such designs.

Accordingly, what is needed is an independent rear suspension for a motor vehicle featuring a reduced assembly height but providing a desired range of travel-induced changes in wheel camber and toe-in.

SUMMARY OF THE INVENTION

In accordance with the invention, an independent rear suspension for a motor vehicle chassis includes a pair of rear corner modules, each of which is adapted to be attached to a respective set of attachment points defined on the vehicle chassis. Under the invention, each rear corner module includes an elongated leaf spring having a forward end, a rearward end, and an intermediate portion between the forward and rearward ends. The forward end of the leaf spring is adapted to be rotatably coupled to the first forward attachment point, as by passing a pin through an eye integrally formed in the forward end of the leaf spring.

In accordance with an aspect of the invention, each rear corner module further includes one or, more preferably, two lateral links, each link having a respective first end that is adapted to be rotatably coupled to a respective transverse attachment point on the vehicle chassis. Each rear corner module also includes a knuckle adapted to rotatably support a wheelend assembly, with the knuckle being nonrotatably coupled to the rearward end of the leaf spring and rotatably coupled to the second ends of each of the module's respective lateral links.

In accordance with another aspect of the invention, each rear corner module further includes a shackle coupled to the intermediate portion of the leaf spring and adapted to be pivotally mounted on the chassis at a second forward attachment point. The shackle maintains the intermediate portion of the leaf spring above the second forward attachment point, and at a predetermined distance from the second forward attachment point. The shackle provides a predetermined nonzero range of relative longitudinal, transverse, and torsional movement of the intermediate portion of the leaf spring relative to the second forward attachment point in response to a vertical displacement of the knuckle relative to the chassis. In this manner, the shackle provides lateral, longitudinal, and torsional (twisting) compliance for the intermediate portion of the leaf spring, relative to the vehicle chassis, that, in turn, creates a desired camber-change and wheel toe-in effect providing improved driving stability.

In accordance with yet another feature of the invention, in a preferred embodiment, the shackle consists of an eye that encompasses the intermediate portion of the leaf spring, and a tension member such as a bolt whose respective ends are pivotally attached to the shackle's eye and the second forward attachment point on the chassis, as by passing the bolt through a slightly enlarged bore defined in each of eye and the attachment point. In this manner, the invention advantageously provides the resulting couple between the intermediate portion of the spring and the chassis with five degrees of freedom while otherwise restricting vertical movement of the intermediate portion of the spring by maintaining a predetermined distance between the intermediate portion of the spring and the second forward attachment point.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE PREFERRED EMBODIMENT

Figure 1:
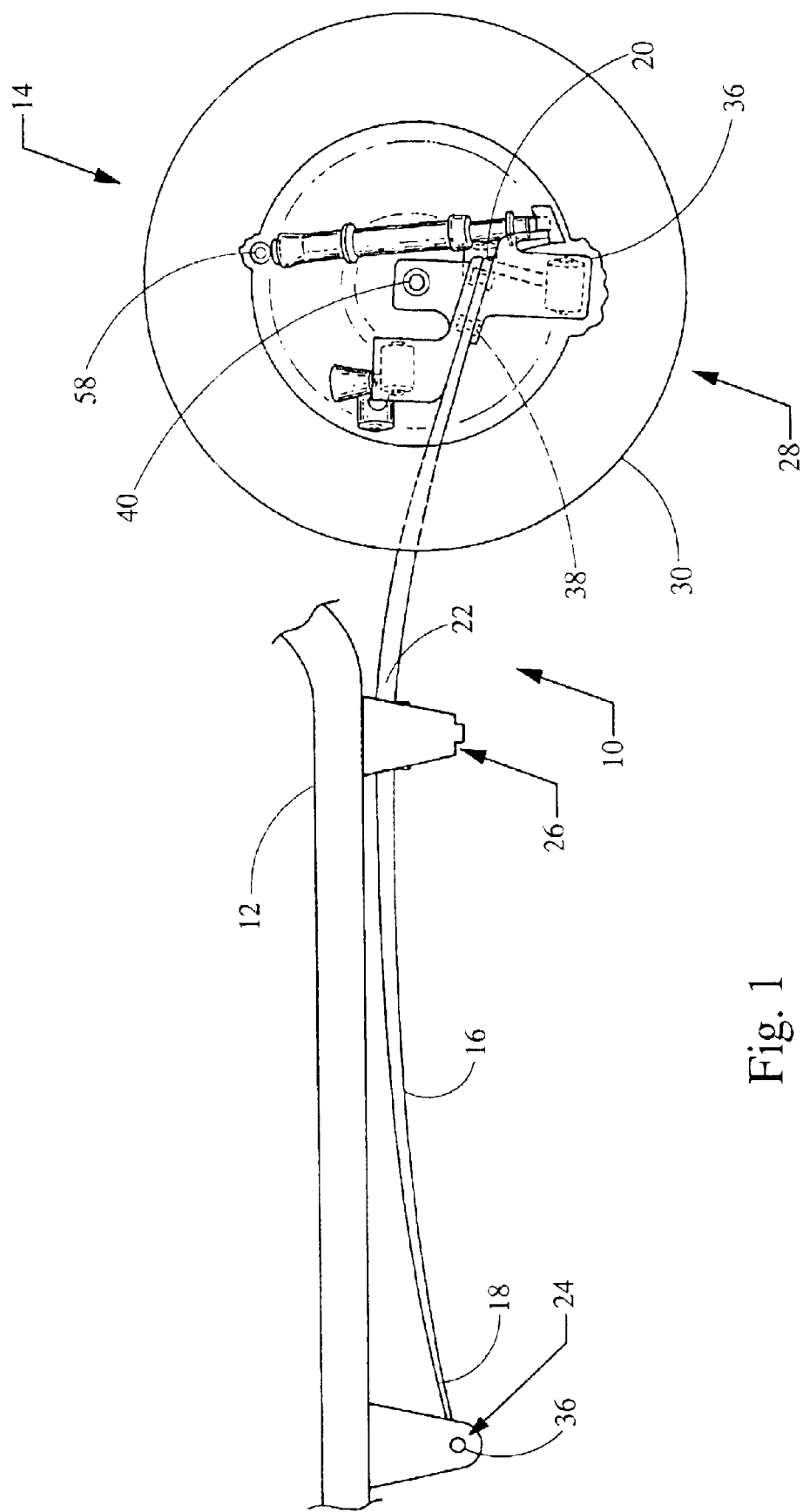
FIG. 1 is a side elevation of a motor vehicle chassis incorporating an independent rear corner module in accordance with the invention.

Referring to FIG. 1, an exemplary independent rear suspension 10 for a motor vehicle chassis 12 includes a pair of rear corner modules 14, each of which is independently coupled to the chassis 12, either directly as illustrated in the Drawings or via a chassis substructure that is itself mounted to the vehicle chassis as by a plurality of hydraulic mounts (not shown).

Figure 2:
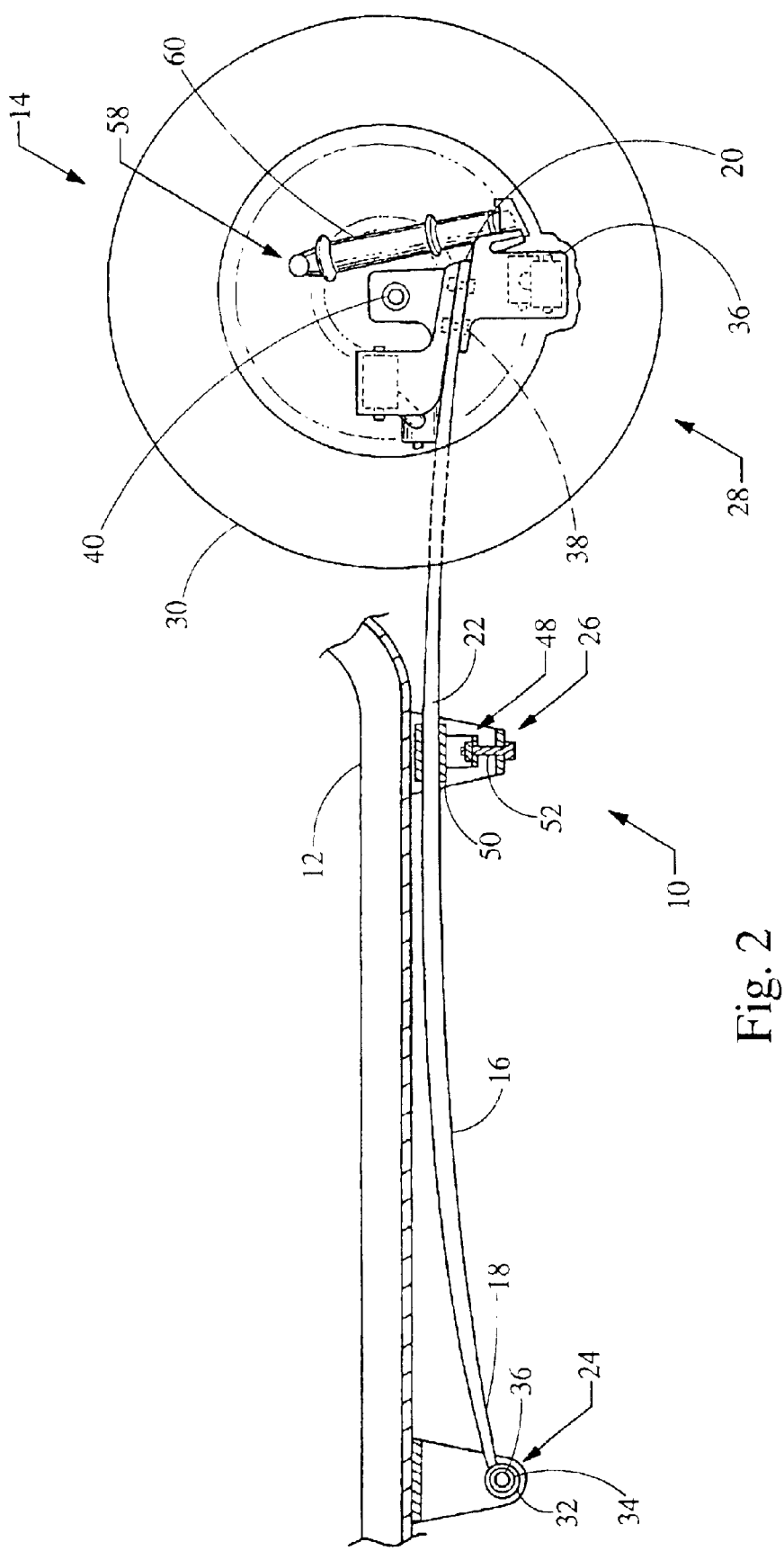
FIG. 2 is a side elevation, similar to that of FIG. 1, showing the forward attachments of the rear corner module to the chassis in partial break-away, and further showing the rear corner module's knuckle vertically displaced toward the chassis.

More specifically, as seen in FIGS. 1 and 2, each rear corner module 14 includes an elongated leaf spring 16 having a forward end 18, a rearward end 20, and an intermediate portion 22 between the forward and rearward ends 18,20. The forward end 18 of the leaf spring 16 is adapted to be rotatably coupled to the first of two forward attachment points 24,26 defined on the chassis 12 generally forward of the nominal location 28 of the module-supported wheelend assembly 30. While the forward end 18 of the leaf spring 16 may be rotatably coupled to the first forward attachment point 24 in any suitable manner, as best seen in partial break-away in FIG. 2, in the exemplary rear suspension 10, the forward end 18 of the leaf spring 16 includes an integrally-formed eye 32 that is journalled, with the aid of a suitable rubber bushing 34, about a chassis-mounted pin 36 that defines the chassis's first forward attachment point 24.

Referring again to FIGS. 1 and 2, the rearward end 20 of each corner module's leaf spring 16 is nonrotatably coupled to a knuckle 36, for example, as with a pair of longitudinally-spaced fasteners 38. In the illustrated exemplary rear suspension 10, each rear wheelend assembly 30 is a nondriven wheelend assembly that is mounted on a spindle 40 defined on the knuckle 36. However, it will be appreciated that, under the invention, the term "knuckle" is intended to broadly encompass any structure by which to support the corner module's wheelend assembly 30, including any suitable casting or forging that includes a bore within which a suitable half shaft is journalled. The knuckle-mounted wheelend assembly 30 may be nondriven or driven.

Figure 3:
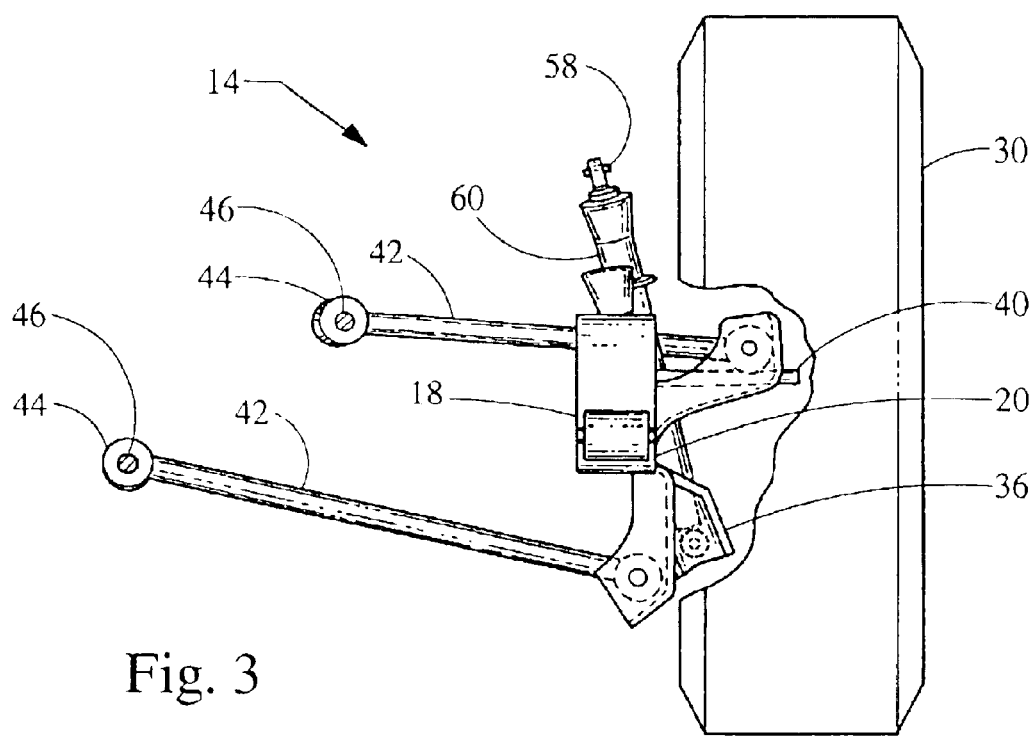
FIG. 3 is a transverse view of the rear corner module, taken along line 3—3 of FIG. 1, with the chassis removed for clarity.
Figure 4:
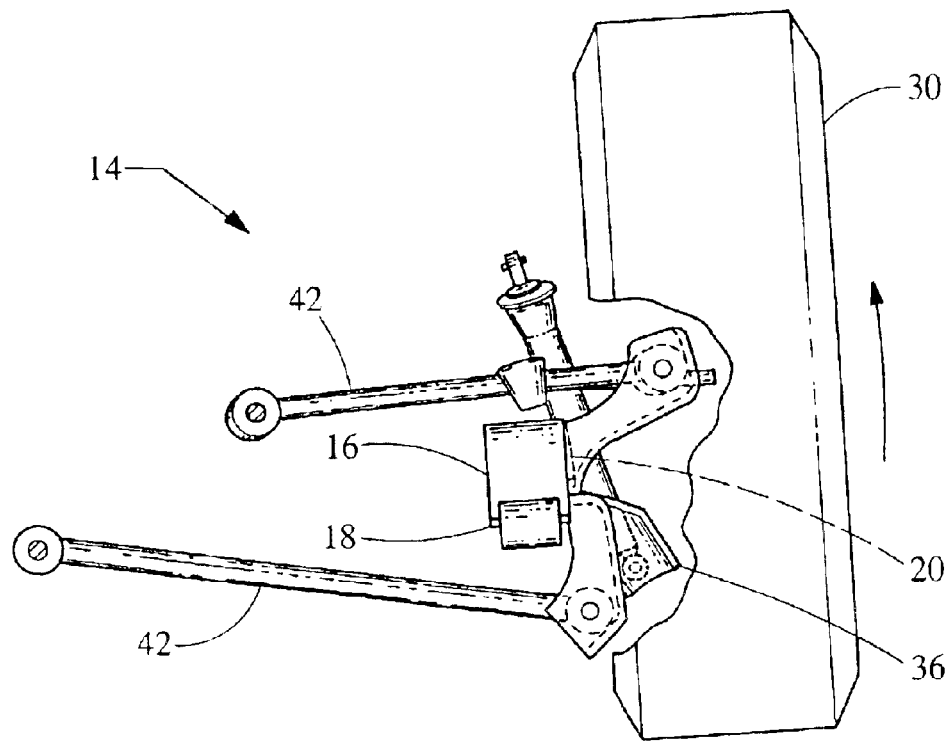
FIG. 4 is a transverse view of the rear corner module, taken along line 4—4 of FIG. 2, with the chassis once again removed for clarity.

As best seen In FIGS. 3 and 4, each rear corner module 14 further includes a pair of longitudinally-spaced lateral links 42 that couple the knuckle 36 to the chassis 12. More specifically, each lateral link 42 includes a respective first end 44 that is adapted to be rotatably coupled to a respective transverse attachment point 46 on the chassis 12 (designated diagrammatically by a pin in FIGS. 3 and 4 for ease of illustration). The lateral links 42, whose respective second ends are rotatably coupled to respective locations on the knuckle 36, are of different lengths in order to define a characteristic range of camber and toe-in changes as the knuckle-supported wheelend assembly 30 is displaced vertically relative to the chassis 12.

Figure 5:
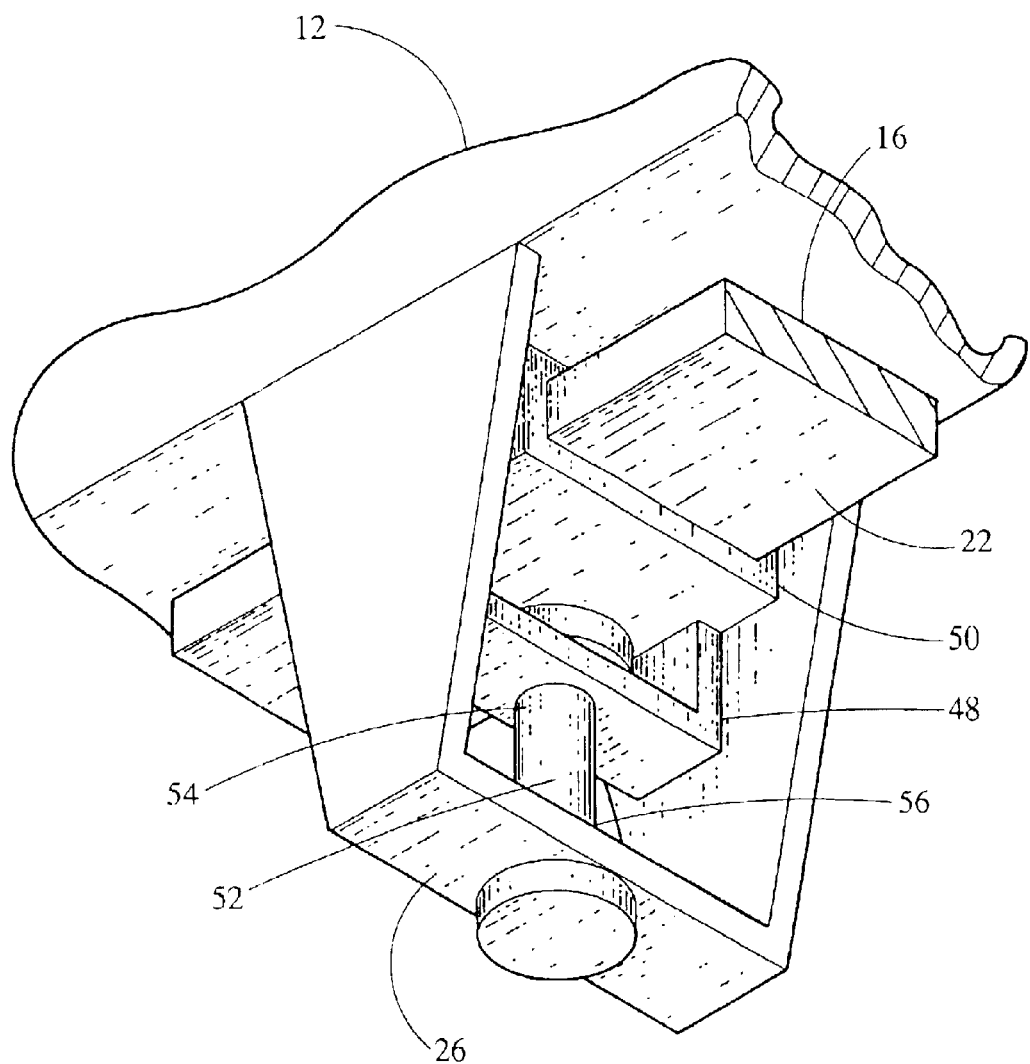
FIG. 5 is a perspective view of the shackle of the rear corner module, by which the intermediate portion of the generally-longitudinally-extending leaf spring is tethered to the second of two forward attachment points on the chassis.

As illustrated in FIGS. 2 and 5, each rear corner module 14 further includes a shackle 48 coupled to the intermediate portion 22 of the leaf spring 16 and adapted to be pivotally mounted on the chassis 12 at the second forward attachment point 26. The shackle 48 consists of an eye 50 that encompasses and, preferably, clamps onto the intermediate portion 22 of the leaf spring 16, and a tension member, such as a bolt 52, whose respective ends 54,56 are pivotally attached to the shackle's eye 50 and the second forward attachment point 26 on the chassis 12, as by a ball joint formed by passing the bolt 52 through a slightly-enlarged bore defined in each of the eye 50 and the second forward attachment point 26.

In accordance with an aspect of the invention, the shackle 48 maintains the intermediate portion 22 of the leaf spring 16 above the second forward attachment point 26, and at a predetermined distance from the second forward attachment point 26. Given the pivotal attachment between the shackle bolt 52 and the shackle eye 50, and between the shackle bolt 52 and the chassis's second forward attachment point 26, the shackle 48 advantageously provides a predetermined non-zero range of relative longitudinal, transverse, and torsional (twisting) movement of the intermediate portion 22 of the leaf spring 16 relative to the second forward attachment point 26 in response to a vertical displacement of the knuckle 36 relative to the chassis 12. In this manner, the shackle 48 provides lateral, longitudinal, and torsional (twisting) compliance for the intermediate portion 22 of the leaf spring 16, relative to the chassis 12, as best seen when respectively comparing FIGS. 1 and 2, and FIGS. 3 and 4. Such compliance, in turn, prevents the leaf spring 16 from otherwise constraining the desired camber-change and wheel toe-in effect provided by the geometries established by the module's lateral links 42.

As best seen in FIGS. 1 and 3, the vehicle chassis 12 further includes an upper attachment point 58 for each rear corner module 14 located generally above the nominal location 28 of the wheelend assembly 30. Each rear corner module 14 also includes a damper 60 adapted to couple the upper attachment point 58 and the knuckle 36, with the damper 60 being respectively pivotally mounted on the upper attachment point 58 and the knuckle 36, for example, using a rubber bushing (not shown).

While the above description constitutes the preferred embodiment, it will be appreciated that the invention is susceptible to modification, variation and change without departing from the proper scope and fair meaning of the subjoined claims.

We claim:

1. An independently-suspended rear corner module for a motor vehicle chassis, wherein the chassis includes two forward attachment points for the corner module generally forward of a nominal wheel location and a first lateral attachment point for the corner module generally transverse of the nominal wheel location, the corner module comprising:

an elongated leaf spring having a forward end, a rearward end, and an intermediate portion between the forward and rearward ends of the leaf spring, wherein the forward end of the leaf spring is adapted to be rotatably coupled to the first forward attachment point;

a first lateral link having a first end and a second end, wherein the first end of the first link is adapted to be rotatably coupled to the first lateral attachment point;

a knuckle adapted to rotatably support a wheelend assembly, the knuckle being nonrotatably coupled to the second end of the leaf spring and rotatably coupled to the second end of the first link;

a shackle coupled to the intermediate portion of the leaf spring and adapted to be pivotally mounted on the chassis at the second forward attachment point, wherein the shackle maintains the intermediate portion of the leaf spring above the second attachment point and at a predetermined distance from the second forward attachment point, and wherein the shackle provides a predetermined nonzero range of relative longitudinal, transverse, and torsional movement of the intermediate portion of the leaf spring relative to the second forward attachment point in response to a vertical displacement of the knuckle relative to the chassis.

2. The rear corner module of claim 1, wherein the first forward attachment point is longitudinally-spaced from the second forward attachment point.

3. The rear corner module of claim 2, wherein the chassis includes a second lateral attachment point for the corner module generally transverse of the nominal wheel location and generally forward of the first lateral attachment point, and wherein the corner module includes a second lateral link having a first end and a second end, the first end of the second link being adapted to be rotatably coupled to the second lateral attachment point, and the second end of the second link being rotatably coupled to the knuckle.

4. The rear corner module of claim 2, wherein the chassis includes an upper attachment point for the corner module generally above the nominal wheel location, and including a damper adapted to couple the upper attachment point and the knuckle.

5. An independently-suspended rear corner module for a motor vehicle chassis, wherein the chassis includes two forward attachment points for the corner module generally forward of a nominal wheel location and a first lateral attachment point for the corner module generally transverse of the nominal wheel location, the corner module comprising:

an elongated leaf spring having a forward end, a rearward end, and an intermediate portion between the forward and rearward ends of the leaf spring, wherein the forward end of the leaf spring is adapted to be rotatably coupled to the first forward attachment point;

a first lateral link having a first end and a second end, wherein the first end of the first link is adapted to be rotatably coupled to the first lateral attachment point;

a knuckle adapted to rotatably support a wheelend assembly, the knuckle being nonrotatably coupled to the second end of the leaf spring and rotatably coupled to the second end of the first link; and a shackle coupled to the intermediate portion of the leaf spring and adapted to be pivotally mounted on the chassis at the second forward attachment point, wherein the shackle maintains the intermediate portion of the leaf spring above the second attachment point and at a predetermined distance from the second forward attachment point, and wherein the shackle provides a predetermined nonzero range of relative longitudinal, transverse, and torsional movement of the intermediate portion of the leaf spring relative to the second forward attachment point in response to a vertical displacement of the knuckle relative to the chassis, wherein the shackle includes an eye encircling the intermediate portion of the leaf spring, and a tension member coupling the eye of the shackle to the second forward attachment point.

6. The rear corner module of claim 5, wherein the tension member of the shackle is adapted to be coupled to the second forward attachment point by a first ball joint.

7. The rear corner module of claim 6, wherein the tension member of the shackle is coupled to the eye of shackle by a second ball joint.

* * * * *